(12) United States Patent
Dees et al.

(10) Patent No.: US 8,051,232 B2
(45) Date of Patent: Nov. 1, 2011

(54) DATA STORAGE DEVICE PERFORMANCE OPTIMIZATION METHODS AND APPARATUSES

(75) Inventors: Brian M Dees, Hillsboro, OR (US);
Amber D. Huffman, Banks, OR (US);
R. Scott Tetrick, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 11/821,616

(22) Filed: Jun. 25, 2007

(65) Prior Publication Data
US 2008/0320241 A1    Dec. 25, 2008

(51) Int. Cl.
*G06F 13/00* (2006.01)
(52) U.S. Cl. ......... 710/107; 710/106; 710/310; 711/151
(58) Field of Classification Search ............... None
See application file for complete search history.

(56) References Cited

U.S. PATENT DOCUMENTS

| | | | | |
|---|---|---|---|---|
| 5,687,316 | A * | 11/1997 | Graziano et al. | 709/250 |
| 5,778,445 | A * | 7/1998 | Ooe et al. | 711/167 |
| 6,018,790 | A * | 1/2000 | Itoh et al. | 711/114 |
| 6,330,646 | B1 * | 12/2001 | Clohset et al. | 711/158 |
| 6,336,179 | B1 | 1/2002 | Gulick | |
| 6,434,117 | B1 * | 8/2002 | Momona | 370/236 |
| 6,934,818 | B2 * | 8/2005 | Okada | 711/154 |
| 7,054,249 | B2 * | 5/2006 | Okada | 369/53.11 |
| 7,277,984 | B2 * | 10/2007 | Ghosal et al. | 711/112 |
| 2005/0138251 | A1 * | 6/2005 | Fanning | 710/107 |
| 2008/0198780 | A1 * | 8/2008 | Sato | 370/310 |

OTHER PUBLICATIONS

Huang et. al, QoS for storage subsystems using IEEE-1394, ACM Journal, vol. 4 Issue 4, Jan. 2009, Article 12.*

* cited by examiner

*Primary Examiner* — Tariq Hafiz
*Assistant Examiner* — Aurangzeb Hassan
(74) *Attorney, Agent, or Firm* — Schubert Law Group PLLC; Neil K. Cohen

(57) ABSTRACT

Methods and apparatuses for identifying types of data streams and communicating stream information to improve performance of data storage devices are disclosed. Method embodiments generally comprise identifying one or more isochronous requests among a plurality of requests which may be issued to a data storage device, assigning a completion deadline an isochronous request, and communicating the isochronous request and completion deadline information to the data storage device. Apparatus embodiments generally comprise a request identifier to identify an isochronous request, a logic module to assign a completion deadline to the isochronous request, and a communication module to communicate the isochronous request and the completion deadline to a data storage device. Alternative apparatus embodiments may include a monitor module to monitor a system process operating in the system and determine if the system process issues isochronous requests. Various embodiments may process asynchronous requests, including prioritized asynchronous requests, with the isochronous requests.

19 Claims, 5 Drawing Sheets

300

| Register | 7 | 6 | 5 | 4 | 3 | 2 | 1 | 0 |
|---|---|---|---|---|---|---|---|---|
| Features | Sector Count 7:0 ||||||||
| Features (exp) | Sector Count 15:8 ||||||||
| Sector Count | 305 → TAG 310 → ||||| Reserved |||
| Sector Count (exp) | PRIO 1:0 || DL 5:0 ||||||
| LBA Low | LBA 7:0 ||||||||
| LBA Low (exp) | LBA 31:24 ||||||||
| LBA Mid | LBA 15:8 ||||||||
| LBA Mid (exp) | LBA 39:32 ||||||||
| LBA High | LBA 23:16 ||||||||
| LBA High (exp) | LBA 47:40 ||||||||
| Device | FUA | 1 | Res | 0 | Reserved ||||
| Command | 60h ||||||||

| PRIO 1:0 | DL 5:0 | Defined use |
|---|---|---|
| 00b (320) | N/A | No priority or isochrony specified (i.e. normal request) |
| 01b (322) | <deadline> | Isochronous request specified using deadline specified in DL |
| 10b (324) | N/A | High priority request specified |
| 11b | N/A | Not defined (reserved for future definition) |

FIG. 3B

DATA STORAGE DEVICE PERFORMANCE OPTIMIZATION METHODS AND APPARATUSES

FIELD

The embodiments herein generally relate to the field of data storage devices. More particularly, the embodiments relate to methods and apparatuses for identifying types of data streams and communicating stream information to improve performance of data storage devices.

BACKGROUND

Digital media applications and devices are becoming more and more popular. Additionally, people are more frequently using computers in homes, workplaces, and schools to interact with the applications and devices. For example, people are recording audio and video streams using devices such as portable media devices and video camcorders. People may record minutes or even hours of such audio and video onto temporary storage mediums, such as analog or digital cassette tapes, and transfer those multimedia streams to more permanent storage mediums, such as digital versatile discs (DVDs) and compact discs (CDs). To transfer such streams from one storage medium to another, people may use desktop or laptop computers. These transfers tend to use a mass storage device to store the data, which may be a hard disk drive or an optical storage drive.

When compared to storage of conventional data on a mass storage device, these new multimedia streams tend to involve transferring relatively larger amounts of data between the computer and the storage device. Additionally, such multimedia streams frequently require adherence to critical transfer timing parameters or otherwise create error-laden or inferior quality multimedia streams. For example, a system recording a video stream may risk dropping frames of video information if the mass storage device misses a timing parameter, such as a transfer deadline.

To complicate matters, additional operating factors may also impact or affect the storage of these modern data streams. One factor may involve concurrently using multiple applications on a single platform. For example, a user may record multiple streams of multimedia content while simultaneously executing applications, such as Microsoft® Excel® or Microsoft® Word, which generate small random input-output (I/O) tasks for the platform and data storage device. In a scenario like this, a storage controller of the platform will receive numerous I/O requests coming from the concurrent applications. Unfortunately, existing controllers and/or device drivers cannot always adequately handle high priority asynchronous data requests along with isochronous requests that are received in order to complete the requests by required request deadlines. Existing hardware and software, including device drives, have no means to identify isochronous requests and associated specific completion deadlines for those requests, in order to help prevent bottlenecks and degrades system performance when processing asynchronous and isochronous I/O requests. Additionally, as platforms are designed with faster processor frequencies and dual/multi-core processors, the processor computation time for handling media requests will shrink and exacerbate the problem of meeting the request deadlines.

BRIEF DESCRIPTION OF THE DRAWINGS

Aspects of the embodiments will become apparent upon reading the following detailed description and upon reference to the accompanying drawings in which like references may indicate similar elements:

FIGS. 3A and 3B illustrate how fields of an NCQ Read operation may communicate whether an I/O request is a high or normal priority asynchronous request and communicate completion deadlines for isochronous requests using different combinations of field values;

DETAILED DESCRIPTION OF EMBODIMENTS

Figure 1:
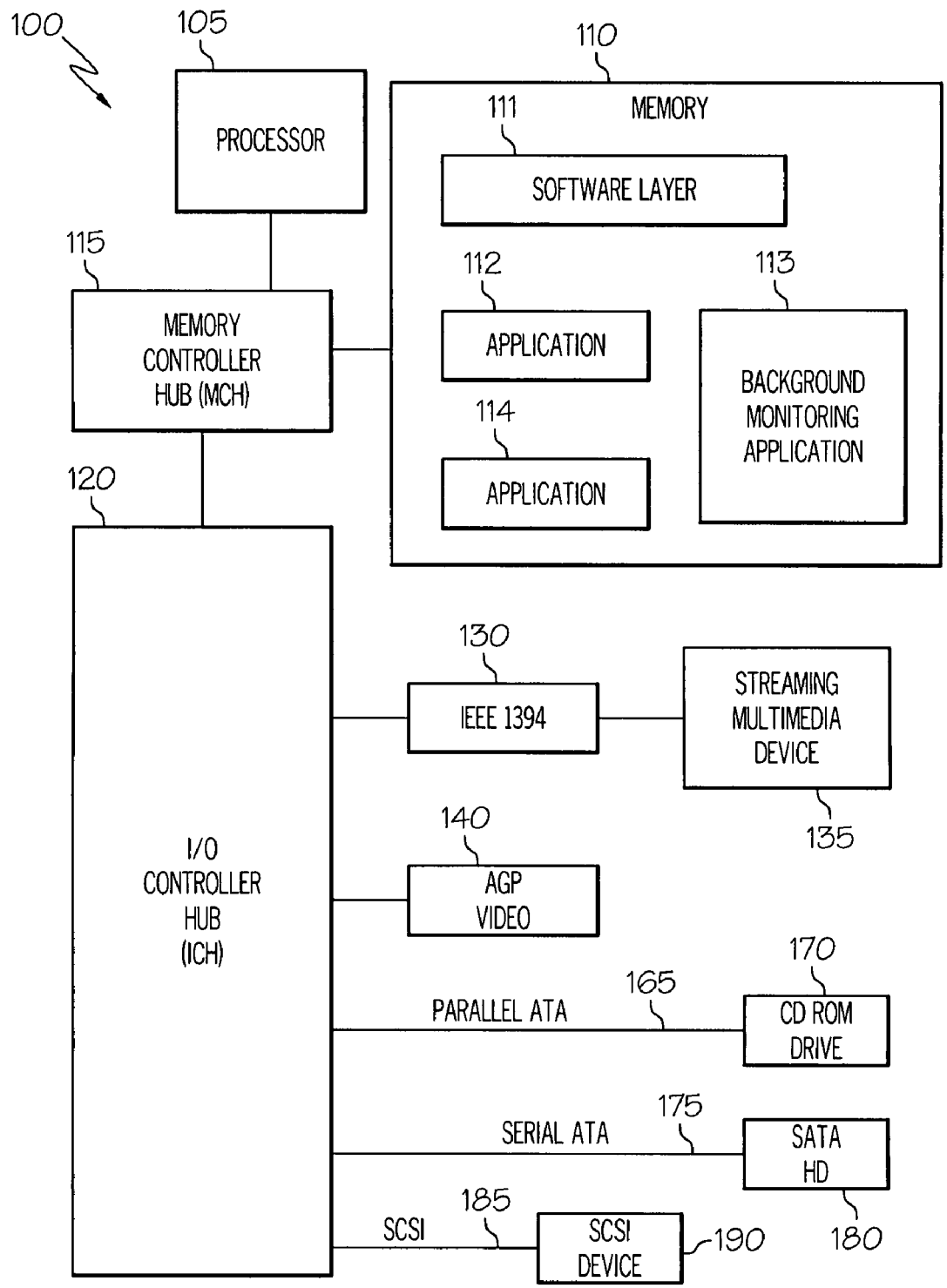
FIG. 1 depicts an apparatus which processes I/O requests for data storage devices, comprising a processor, memory, a memory controller hub, an I/O controller hub, a streaming multimedia device, and several a data storage devices.

The following is a detailed description of embodiments depicted in the accompanying drawings. The specification is in such detail as to clearly communicate the embodiments. However, the amount of detail offered is not intended to limit the anticipated variations of embodiments; but on the contrary, the intention is to cover all modifications, equivalents, and alternatives consistent with the spirit and scope of the embodiments as defined by the appended claims.

Generally speaking, methods and apparatuses for identifying types of data streams and communicating stream information to improve performance of data storage devices are contemplated. Method embodiments generally comprise identifying one or more isochronous requests among a plurality of requests which may be issued to a data storage device, assigning a completion deadline to an isochronous request, and communicating the isochronous request, the completion deadline information, and one or more of the other requests to the data storage device to allow prioritization, by the data storage device, of the requests based upon the completion deadline. Alternative method embodiments may include monitoring a process to identify the isochronous request. In some of these method embodiments that include the monitoring function, the monitoring of the process may be performed by running a background task or application which examines processes which are running in the system. Additional method embodiments may include communicating the isochronous request and assigned completion deadline to a controller of the data storage device. Even further method embodiments may also sort the isochronous request and other isochronous requests, in an isochronous queue to improve throughput of processing commands by the controller. Embodiments may sort isochronous requests and other asynchronous requests in one or more queues to improve throughput of processing commands by the controller.

Various method embodiments may identify the isochronous request by determining if the isochronous request is issued from a process, such as an application running in the system that routinely or generally generates isochronous requests. Other method embodiments may identify the request as an isochronous request by collecting request information from a software layer which has information which characterizes a request as an isochronous request. In some of these method embodiments, the software layer which has the information may be an application which issues at least one isochronous request itself.

Apparatus embodiments generally comprise a request identifier to identify an isochronous request in a plurality of requests to be issued to the data storage device, a logic module to assign a completion deadline to the isochronous request, and a communication module to communicate the isochronous request and the completion deadline to a data storage device. Alternative apparatus embodiments may include a monitor module to monitor a system process operating in the system and determine if the system process issues isochronous requests.

Other alternative apparatus embodiments may include random access memory (RAM) and have a data storage device comprising a serial hard disk drive, a parallel hard disk drive, an optical storage drive, a digital versatile disc drive, or a flash memory drive. Some apparatus embodiments may include logic to compare the isochronous request with pending requests in at least one drive queue and sort the requests based on geometry of the data storage device, completion deadline information, priority information for asynchronous requests, or other platform resource availability considerations.

Turning now to the drawings, FIG. 1 shows an embodiment of an apparatus 100 which processes I/O requests for one or more data storage devices. Apparatus 100 may comprise, as examples, a notebook computer, a desktop computer, a personal digital assistant (PDA), or a portable media device. Apparatus 100 may have a processor 105. In some embodiments, processor 105 may comprise a single core processor, while in other embodiments processor 105 may comprise a multiple-core processor. Processor 105 may be coupled to a memory controller hub (MCH) 115.

Processor 105 may execute operating instructions of user applications, such as instructions multimedia streaming applications, in memory 110 by interacting with MCH 115. MCH 115 may also couple processor 105 with an I/O controller hub (ICH) 120. ICH 120 may allow processor 105 to interact with external peripheral devices, such as keyboards, scanners, data storage devices, and multimedia devices, such as streaming multimedia device 135. For example, streaming multimedia device 135 may comprise a FireWire® hard disk drive or a digital video camera coupled to ICH 120 via a high speed data port, an Institute of Electrical and Electronic Engineers (IEEE) 1394 port 130. [See IEEE p1394 Working Group (1995), IEEE Std. 1394-1995 High Performance Serial Bus, IEEE, ISBN 0-7381-1203-8] [See also IEEE p1394a Working Group (2000), IEEE Std. 1394a-2000 High Performance Serial Bus—Amendment 1IEEE, ISBN 0-7381-1958-X] [See also IEEE p1394b Working Group (2002), IEEE Std. 1394b-2002 High Performance Serial Bus—Amendment 2IEEE, ISBN 0-7381-3253-5] In alternative embodiments, streaming multimedia device 135 may comprise digital video editing equipment, a digital video cassette recorder, a digital audio player, or any combination or number of such devices.

A user of apparatus 100 may want to transfer video files out of streaming multimedia device 135 and store them on a different or more permanent storage medium, such as a digital versatile disc (DVD) or compact disc (CD). For example, the user may wish to write the files to a CD inserted into a compact disc read only memory (CD ROM) drive 170. Transferring the video files being out of streaming multimedia device 135 may involve using a series of isochronous requests being sent to and from processor 105 from streaming multimedia device 135 and CD ROM drive 170. Isochronous requests may involve data transfers that require data delivery at constant intervals which require regular bus access. By contrast, asynchronous requests may involve data transfers that guarantee data delivery without requiring a constant bus bandwidth or a regular use of the bus.

Apparatus 100 may be configured to present information, such as application windows and streaming multimedia video, to a user via a display device coupled to Advanced Graphics Port (AGP) video card 140. In some embodiments, the type of display device may be a CRT monitor or a LCD screen or a thin-film transistor flat panel monitor.

ICH 120 in apparatus 100 may interact with various data storage devices such as Advanced Technology Attachment (ATA) drives, such as ATA hard drives, CD drives, and DVD drives. For example, ICH 120 may need to read asynchronous and isochronous streams from CD ROM drive 170 via a parallel ATA bus 165. [See Information Technology—AT Attachment with Packet Interface—7—Volume 3—Serial Transport Protocols and Physical Interconnect (ATA/ATAPI-7 V3), http://webstore.ansi.org/ansidocstore/product.asp?sku=ANSI+INCITS+397%2D2005+%28Vol%2E+3%29] CD ROM drive 170 may vary in different embodiments of apparatus 100, such as comprising a compact disc recordable (CD-R) drive, a CD rewritable (CD-RW) drive, a DVD drive, or other storage device.

Apparatus 100 may also have a Serial ATA (SATA) bus 175 which may couple a serial hard disk drive, such as SATA hard drive 280, an optical drive, a tape drive, or other storage device, to ICH 120. [See Serial ATA Revision 2.6, February-2007, http://www.serialata.org/specifications.asp] SATA hard disk drive 180 may be used to store and retrieve asynchronous and isochronous streams stored on SATA hard disk drive 180, via asynchronous and isochronous requests processed by processor 105, MCH 115, and ICH 120. Apparatus 100 may also be coupled to other types of hardware devices, such as Small Computer Systems Interface (SCSI) device 190 via a SCSI bus 185. For example, SCSI device 190 may comprise a SCSI hard disk drive or a SCSI Redundant Array of Independent Disks (RAID). Similar to SATA hard disk drive 180, SCSI device 190 may be used to store and retrieve asynchronous and isochronous streams stored on SCSI device 190, via asynchronous and isochronous requests processed by processor 105, MCH 115, and ICH 120. Similar to SCSI device 190 comprising a SCSI RAID, SATA hard disk drive 180 may also comprise a SATA RAID in alternative embodiments.

In different embodiments, processor 105, MCH 115, and memory 110 may operate at relatively fast operating speeds when compared to the operating speed of the individual data storage devices, such as SATA hard disk drive 180 and CD ROM drive 170. Accordingly, each storage device may improve both apparatus 100 performance and the performance of the data storage device by employing a technique referred to as command queuing. For example, one or more data storage devices within apparatus 100 may employ such command queuing methods as Tagged Command Queuing and Native Command Queuing. [See Information Technology—AT Attachment with Packet Interface—7—Volume 3—Serial Transport Protocols and Physical Interconnect (ATA/ATAPI-7 V3), http://webstore.ansi.org/ansidocstore/product.asp?sku=ANSI+INCITS+397%2D2005+%28Vol%2E+3%29] [See Also Serial ATA Revision 2.6, February-2007, http://www.serialata.org/specifications.asp] By employing command queuing, a data storage device, such as a hard drive, may accept numerous asynchronous and isochronous I/O requests, place them in one or more queues, and dynamically reorder outstanding requests before executing them to reduce mechanical overhead and improve I/O latencies.

Apparatus 100 may improve performance of data storage devices by identifying isochronous requests and associating specific completion deadlines to the individual I/O requests.

Specifically having deadline information for each of the I/O requests may allow a storage driver to create "windows" of available bandwidth in the disk pipeline allowing space for asynchronous I/O to be completed concurrently with multiple media streams. For example, having deadline information for one or more isochronous I/O requests issued to SATA hard disk drive 180 may allow a storage driver for SATA hard disk drive 180, or SATA hard disk drive 180 itself without the use of a storage driver, to complete one or more asynchronous I/O requests at "windows" of opportunities in the disk pipeline, based on scheduling the isochronous I/O request. Additionally, having deadline information for one or more isochronous I/O requests may allow SATA hard disk drive 180 to prioritize multiple requests which may be pending for the drive. The multiple requests may be isochronous requests, asynchronous requests, or a combination of both isochronous and asynchronous requests. Also, the multiple requests may be pending in one or more queues for SATA hard disk drive 180. Depending on the embodiment, the queues may be in SATA hard disk drive 180, in a system coupled with SATA hard disk drive 180, or a combination of both.

Apparatus 100 may communicate I/O request information to a disk drive, such as SATA hard disk drive 180, based on priority or isochronous behavior. Apparatus 100 may need to communicate such deadline information, because communicating only priority information may not be sufficient for isochronous requests. In other words, the goal of "windowing" requests may not be attained because isochronous requests, if marked as high priority, may otherwise be executed as soon as possible and not according to the deadline, thus starving out other I/O traffic.

Apparatus 100 may focus priority information specifically to asynchronous I/O, and apply another processing model for handling isochronous. Handling asynchronous and isochronous I/O requests differently may help ensure that an I/O request may be serviced when it needs to be, rather than as quickly as possible. The combination of these solutions may provide a system implementation which benefits multi-threaded usages for end users that may include different types of I/O requests. To handle asynchronous and isochronous I/O requests, apparatus 100 may identify isochronous tasks in a multi-threaded scenario, transmit completion deadline information to storage controller and/or drivers, and transmit priority/isochronous flag and command completion deadline information, as necessary, to the data storage devices.

To illustrate how apparatus 100 may transmit deadline information and priority information to data storage devices, we focus our attention on background monitoring application 113. Background monitoring application 113 may continually monitor the apparatus or system processes running at any given time and specifically identify whether an existing process is an owner of an isochronous request. Different embodiments may accomplish the identification in different ways. For example, in one embodiment background monitoring application 113 may include information that identifies specific processes or applications, such as application 112, which are known to generate isochronous requests.

In an alternative embodiment, background monitoring application 113 may collect request information from a higher software layer, such as software layer 111, which has supplementary knowledge about the process or specific requests being generated. In some embodiments, background monitoring application 113 may collect the request information from the process which is generating the requests. In even further embodiments, the software generating the I/O requests may differentiate isochronous I/O requests from asynchronous I/O requests, resulting in a single process. In other words, an application such as 114 may generate both isochronous and asynchronous I/O requests. Application 114 may transmit completion deadline information to storage controller and/or drivers for the isochronous I/O requests.

Apparatus 100 may assign completion deadlines for new isochronous I/O requests per the given application or media type. For example, apparatus 100 may assign the completion deadlines via background monitoring application 113 or another application running in memory 110. Apparatus 100 may generate the specific deadlines per request based on information about the parent process that generates the requests, the media file type being accessed, the amount of other concurrent requests at a given time, or the environment in which the I/O requests are being generated, e.g. local to system I/O requests versus I/O requests to networked storage.

Apparatus 100 may send notification to a driver for a data storage device to associate specific deadlines with appropriate isochronous I/O requests. Once the host controller or driver of the data storage receives information that indicates an I/O is high priority or isochronous, the controller or driver may use this information in several ways. First, the driver may use this information to optimize the command sequence with which it communicates with a disk drive, including the pre-ordering of requests with the intent of providing a better user experience. Second, the driver may choose to communicate the high priority or isochronous information to the data storage device. To do this, apparatus 100 may initialize an appropriate flag while creating the command and communicate the status of the flag to the driver for the data storage device. For example, apparatus 100 may communicate the status of the flag through ATA command interface protocols. If the request is indeed isochronous, then the controller of the data storage device may also supply a completion deadline for the data storage device to consider when executing the command along with other outstanding requests, wherein the other outstanding requests may be isochronous requests, asynchronous requests, or a combination of both. Communicating completion deadline information for one or more isochronous requests to the data storage device will allow the data storage device to prioritize, or schedule, the outstanding requests so that the isochronous requests with deadlines are processed in time for the deadline.

While apparatus 100 is shown to have numerous peripheral devices attached in the embodiment of FIG. 1, other embodiments may have different combinations of such hardware devices, such as only one or two of the devices. Additionally, apparatus 100 may be coupled with other types of hardware not described, such as a sound card, a scanner, a printer, and other types of hardware devices. Such devices may transmit or receive isochronous and/or asynchronous data, requiring data storage devices of apparatus 100, such as SATA hard disk drive 180, to handle multiple isochronous and/or asynchronous requests. Some embodiments may include additional devices which generate isochronous and/or asynchronous data, such as a keyboard, a microphone, a web cam, or a universal serial bus (USB) device. [See Universal Serial Bus Revision 2.0 specification, 21-December-2000, http://www.usb.org/developers/docs/usb_20_02212005.zip] In other words, apparatus 100 depicted in FIG. 1 is intended to provide an illustrative embodiment which may be varied in actual embodiments.

Figure 2:
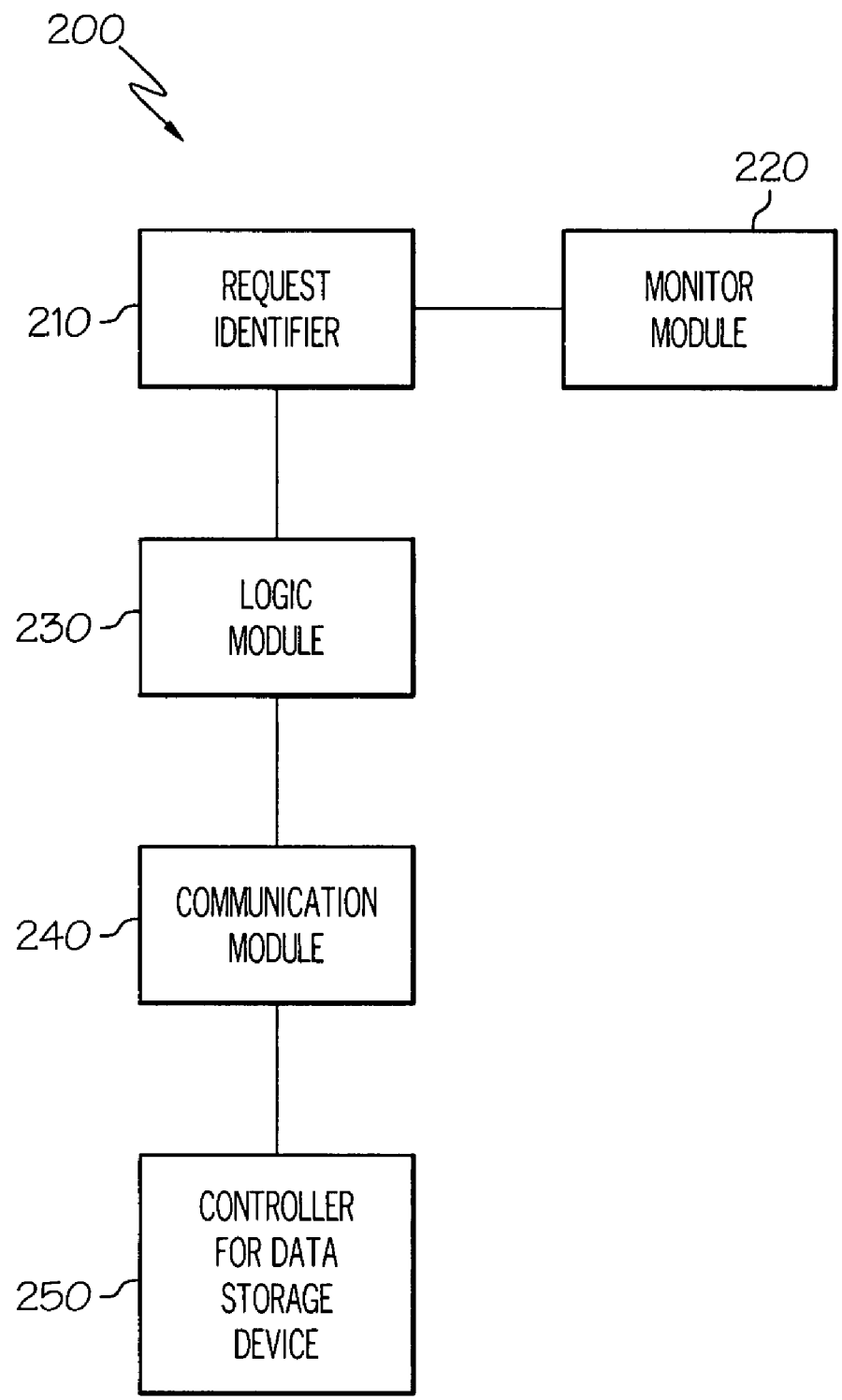
FIG. 2 shows an apparatus for processing isochronous requests, comprising a request identifier, a logic module, and a communication module.

To illustrate in more detail how apparatus 100 may identify types of data streams and communicate stream information to improve performance of data storage devices, we turn now to FIG. 2. FIG. 2 shows an apparatus 200 for processing isochronous requests, comprising a request identifier 210, a logic module 230, a monitor module 220, and a communication module 240. Apparatus 200 may comprise hardware, software, or a combination of hardware and software in one or more parts of apparatus 100 in FIG. 1. For example, apparatus 200 may comprise a chipset of ICH 120 working in conjunction with a software device driver loaded into memory 110.

Request identifier 210 may identify isochronous and asynchronous requests in apparatus 200. For example, request identifier 210 may comprise a software algorithm in application 114 that differentiates isochronous I/O requests from asynchronous requests generated by application 114. Request identifier 210 may work in conjunction with monitor module 220 to identify isochronous requests. For example, monitor module 220 may comprise an application running in system memory, monitoring other applications executed by the system. In such an arrangement, request identifier 210 may comprise a subroutine of monitor module 220. Monitor module 220 may work in conjunction with request identifier 210 to identify isochronous I/O requests issued by the applications of the system. When isochronous I/O requests are encountered, monitor module 220 and/or request identifier 210 may communicate information pertaining to the request to logic module 230. For example, when application 112 of FIG. 1 generates isochronous requests, monitor module 220 and/or request identifier 210 may transmit information that associate the requests with application 112, indicate the time that each request was generated, etc., to logic module 230.

Each I/O request transmitted to logic module 230 may carry information to characterize it as a normal or high priority asynchronous request or as an isochronous request. Logic module 230 may separate and store each request into an individual queue based on the type of request. For example, a queue module may store normal and high priority asynchronous requests in an asynchronous queue and store isochronous requests in an isochronous queue. As new I/O requests enter apparatus 200, logic module 230 may insert the new I/O requests into the respective queues.

In sorting the I/O requests in the respective queues, logic module 230 may evaluate the information received from monitor module 220 and/or request identifier 210 and determine when individual I/O requests need to be completed. For example, logic module 230 may compare or evaluate numerous isochronous tasks which are pending in the isochronous queue, continually calculate deadlines for each of the isochronous requests based on a prioritization scheme, and transmit completion deadline information to a storage controller and/or drivers along with the associated I/O requests. When evaluating the isochronous tasks, logic module 230 may also consider asynchronous requests and their associated priority information when calculating the deadlines and transmitting the completion deadlines for the isochronous tasks.

Communication module 240 may monitor the operation of a data storage device and transfer or communicate the I/O requests to a controller 250 for the data storage device. For example, communication module 240 may transfer asynchronous and isochronous I/O requests from the respective asynchronous and isochronous queues, based on the prioritization established by logic module 230.

As previously mentioned, I/O requests may be processed via hardware, software, or a combination of both. One embodiment may process the I/O requests using hardware and software of a serial ATA interface, such as a serial ATA interface for SATA hard disk drive 180 shown in FIG. 1. Additionally, the embodiment may process the I/O requests using the Native Command Queuing (NCQ) protocol. The NCQ protocol may provide good asynchronous performance for the data storage device. By communicating completion deadlines with isochronous requests, the data storage device may optimize performance based on priority of the asynchronous requests and isochronous completion deadlines.

Depending on the embodiment, the elements of apparatus 200 may exist in different devices. For example, in one embodiment request identifier 210, monitor module 230, logic module 230, and communication module 240 reside may reside in a computer as hardware and/or software. In another embodiment, logic module 230 and communication module 240 may reside in a data storage device, such as in a circuit board coupled with controller 250. Additionally, in even further embodiments, logic module 230, communication module 240, and controller 250 may actually be combined into one element, such as a single circuit board or a single integrated circuit chip. In other words, logic module 230, communication module 240, and controller 250 may appear to be one device but perform similar or equivalent functions.

FIG. 3A displays how fields of an NCQ Read operation 300 may denote whether an I/O request is high priority or isochronous (i.e. PRIO) using field 305. NCQ Read operation 300 may also communicate completion deadlines for isochronous requests (i.e. DL) using a second field 310. The deadline communicated within the DL field 310 may be based on time variables and may be communicated using different resolutions as necessary (e.g., millisecond, microsecond, second). Depending on the embodiment, the data storage device receiving NCQ Read operation 305 may only consider DL field 310 if the value of field 305 (PRIO) is 01b. An apparatus communicating NCQ Read operation 300 to a data storage device may only set field 305 equal to 01b for isochronous requests. While FIG. 3A displays fields for a NCQ Read operation 300, NCQ Write operations may similarly communicate priority and deadline information using similar fields in NCQ Write operation packets. Communicating the priority and deadline in the aforementioned manner may be carried out in numerous embodiments. Alternative embodiments may communicate the priority and deadline in various other ways, such as using other fields.

FIG. 3B depicts a table 315 illustrating different defined uses for different combinations of values for priority (PRIO) field 305 and deadline (DL) field 310. For example, entry 320 shows that an NCQ operation may have no priority or isochrony specified. In other words, field 305 may be set to 00b for normal requests issued to a data storage device. Entry 324 illustrates that field 305 may be set to 10b whenever the NCQ operation involves a high priority asynchronous request. Entry 322 illustrates that field 310 may communicate deadline information to the data storage device, for isochronous requests, whenever field 305 is set to 01b. The values of table 315 may vary in different embodiments. In other words, table 315 only shows one possible definition for priority field 305 and deadline field 310. Additionally, while the embodiment illustrated by table 315 in FIG. 3B may only communicate high priority asynchronous requests or isochronous requests with deadline values, alternative embodiments may also further establish a prioritization for isochronous requests as well. In other words, field 305 may communicate priority information, such as high, normal, or low priority isochronous requests in addition to field 310 communicating the deadline information.

Figure 3C:
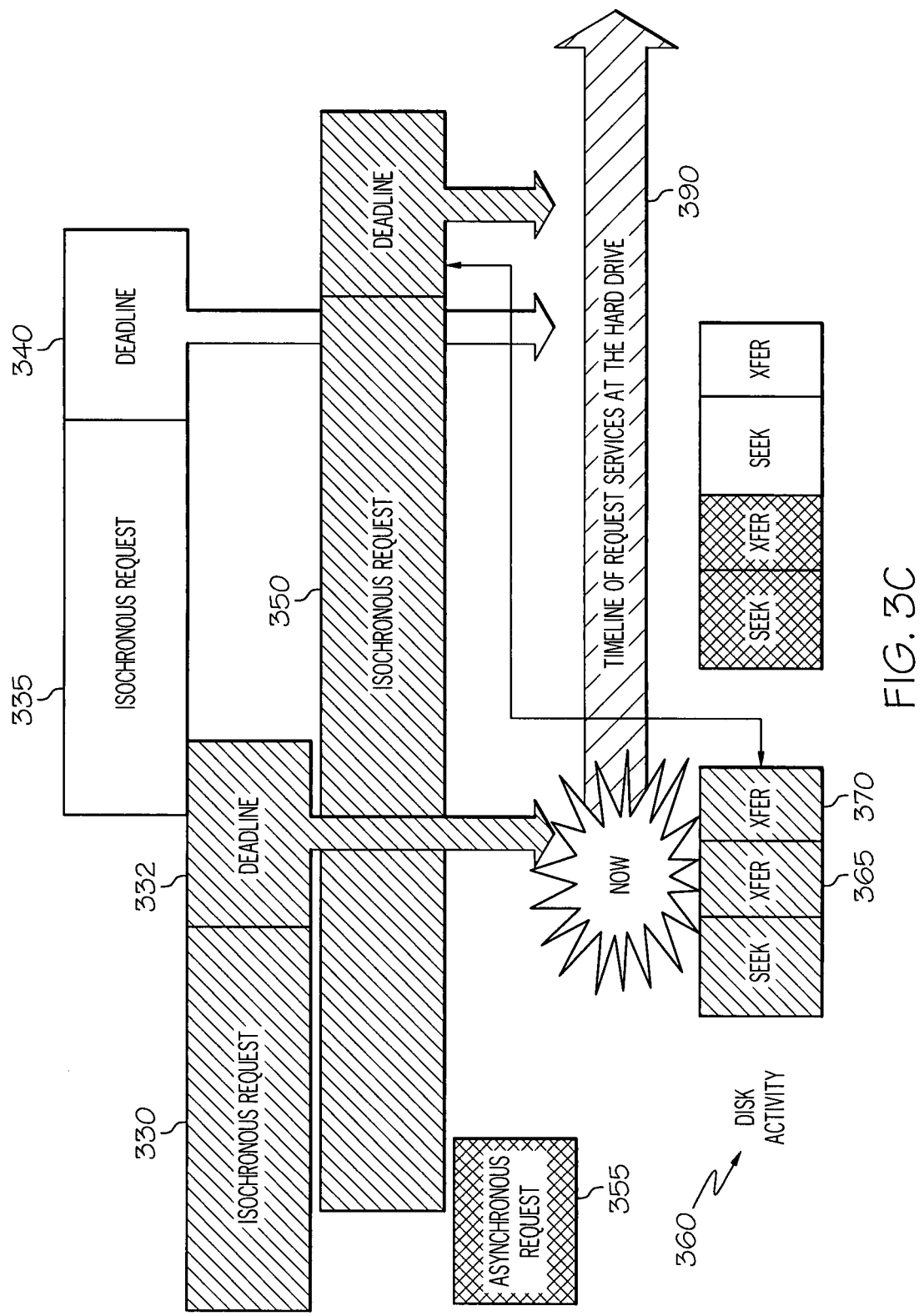
FIG. 3C illustrates how an algorithm may improve isochronous service.

FIG. 3C illustrates how an algorithm may improve isochronous service. More specifically, FIG. 3C illustrates how an apparatus may improve isochronous service with an algorithm that uses, for example, information contained in fields 305 and 310 shown in FIG. 3A and FIG. 3B. The apparatus may be apparatus 100, shown in FIG. 1, or apparatus 200, shown in FIG. 2.

Apparatus 100 may have a high level of disk contention due to multiple streams of I/O requests. Each of these requests may require a seek activity prior to its service. Seek times on data storage devices, such as hard drives, may be significantly longer than transfer times for the data, which may only be tens of milliseconds in duration. Excessive seeking may increase the noise and power of the drive, as well as reduce its reliability.

When apparatus 100 processes isochronous streams, the streams may involve large files. Large files are likely to be stored in a relatively sequential fashion on the disk drive. The more seek actions that a drive can avoid, the more the drive can increase the time it is transferring data. Consequently, when apparatus 100 assists the drive in avoiding such seek actions the apparatus may increase its efficiency and improve the overall performance of apparatus 100.

As noted above, FIG. 3C shows an embodiment of an algorithm implementation. The timeline arrow 390 represents the passage of time of a data storage device. In this example, isochronous request 330 and isochronous request 350 may comprise two outstanding requests of a stream. An apparatus or system may be currently serving the first outstanding request, isochronous request 330. This service is illustrated at the bottom of FIG. 3C on disk activity stream 360. The apparatus may correctly find the earliest deadline 332 and service it.

The apparatus will then need to schedule the next request. If the apparatus only follows deadlines, the apparatus may then schedule isochronous request 335 next, since it would have the earliest corresponding deadline 340. The apparatus may look at required deadline 340 and opportunistically schedule asynchronous request 355 because the apparatus can fill the gap between servicing isochronous request 330 and isochronous request 335. However, when the apparatus encounters multiple streams in such a scenario, each request from each isochronous stream may require that its own seek precede the service of that request. If the apparatus ignores deadline information, this may limit the ability of the system to take advantage of the sequential nature of the media streams.

Rather than blindly follow the 'earliest deadline first,' the apparatus and the data storage device have some beneficial information at their disposal which may allow them to take advantage of the sequential nature of the media streams and improve performance of the system employing the apparatus. First, only the data storage device may know where its read-write head is at a specific point in time. This head location information may not be externally available to any other entity in the system. Second, the data storage device may have information about the device geometry—more specifically, the mapping of Logical Block Address (LBA) to track head and cylinder on the data storage device. The data storage device may be able to calculate or determine the time required to obtain the request from the current location. Based on the calculation of time, the data storage device may reorder pending requests to service them in a more efficient manner while still meeting isochronous deadlines.

Focusing again on FIG. 3A, the data storage device may use the priority and deadline information, which may be communicated by fields 305 and 310, to decide the next request should be isochronous request 350 instead of isochronous request 335, even though its deadline is later, because it too can be opportunistically inserted into the disk activity stream 360. In other words, the data storage device may service transfer 370 immediately after transfer 365, taking advantage of the sequential nature of the associated media stream. In the case where the data for these requests are stored sequentially, the data storage device may save an entire seek operation. This method may be repeated numerous times while the data storage device operates to save multiple seeks. Saving the seek activities may increase the effective transfer sizes for the I/O requests by bundling multiple requests into a single, longer, sequential request.

Figure 4:
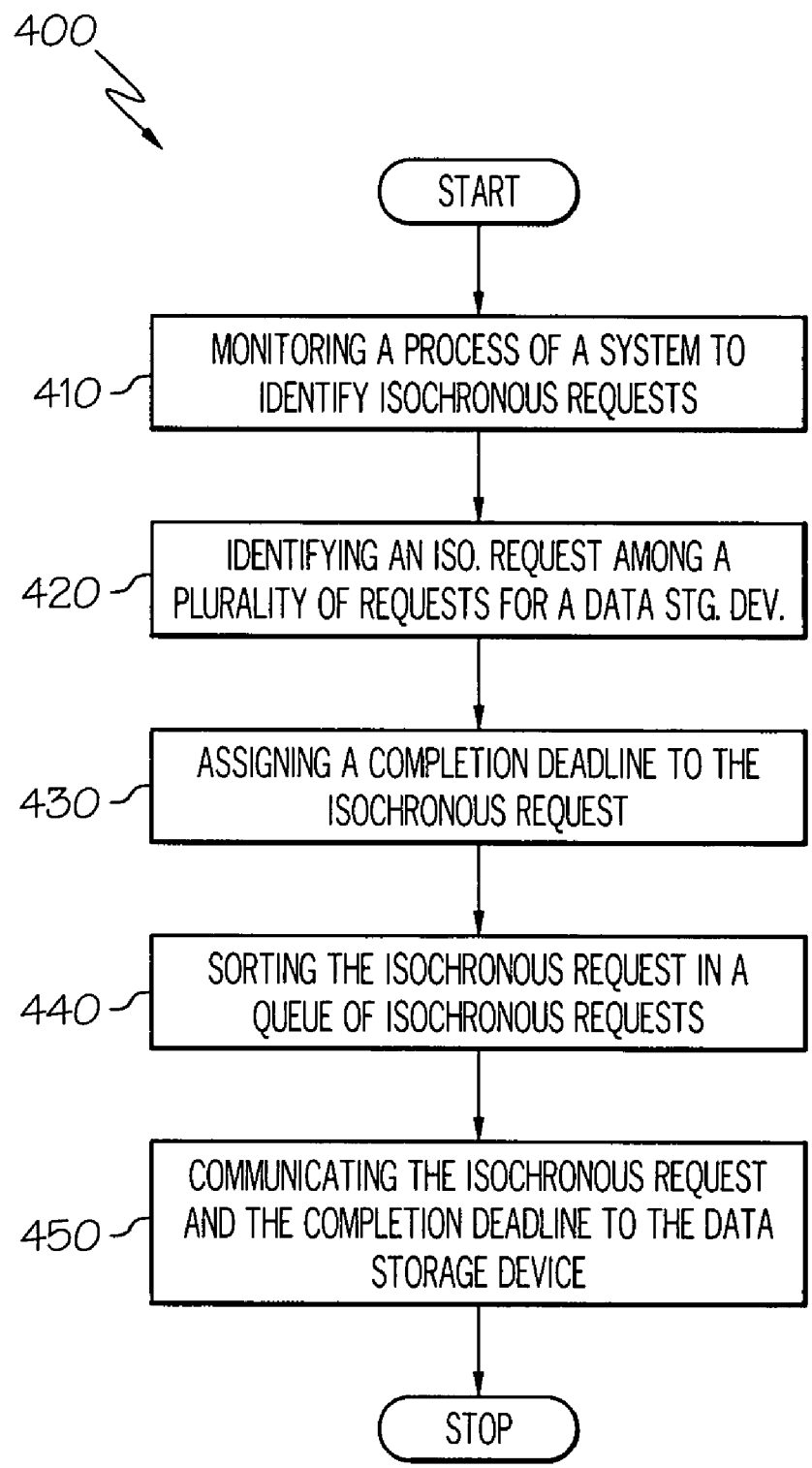
FIG. 4 illustrates a method of improving performance of a data storage device by assigning and communicating deadline information for an isochronous request.

FIG. 4 depicts a flowchart 400 illustrating an embodiment of a method for improving performance of a data storage device by assigning and communicating deadline information for an isochronous request. Flowchart 400 begins with monitoring a process of a system to identify isochronous requests (element 410). For example, processor 105 may generate isochronous read-write requests when executing a multimedia application 112 to retrieve and save isochronous data associated with streaming multimedia device 135 as shown in FIG. 1. Background monitoring application 113 may monitor the execution of application 112 to identify isochronous I/O requests issued by it.

An embodiment according to flowchart 400 may continue by identifying an isochronous request among numerous I/O requests (element 420). Continuing with our example, background monitoring application 113 may identify when application 112 issues an isochronous I/O request to a data storage device, such as CD ROM drive 170. In examples for other embodiments, an application that issues the isochronous request may identify it as an isochronous request, without the need for background monitoring. The numerous I/O requests of element 420 may also include a number of asynchronous requests. An embodiment may service one or more asynchronous requests before one or more isochronous requests, if no isochronous deadlines are going to be missed. In other words, asynchronous requests may be inherently higher priority if no isochronous deadline is imminent.

An embodiment according to flowchart 400 may continue by assigning a completion deadline to the isochronous request (element 430) and sorting isochronous requests with associated deadlines in an isochronous queue (element 440). For example, an apparatus may use information contained in NCQ operation fields 305 and 310, shown in FIG. 3A, to calculate completion deadlines (element 430) for isochronous requests. A device within the apparatus, such as logic module 230 shown in FIG. 2, may place the isochronous requests in a queue and prioritize or sort the requests (element 440) based upon the completion deadline information and any other information that may be available for other outstanding requests. As the data storage device executes various I/O requests issued to it and readies itself for new I/O requests, an embodiment according to flowchart 400 may communicate the isochronous request and calculated deadline to the data storage device (element 450). For example, communication module 240 may communicate the isochronous request and calculated deadline to the controller 250 for a data storage device, as illustrated in FIG. 2.

It will be apparent to those skilled in the art having the benefit of this disclosure that the embodiments herein contemplate methods and apparatuses for identifying types of data streams and communicating stream information to improve performance of data storage devices. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. A method, comprising:
   assigning, by a computer, a first deadline to a first isochronous request;
   assigning, by the computer, a second deadline to a second isochronous request, wherein the second deadline is different from the first deadline;
   assigning, by the computer, a third deadline to a third isochronous request, wherein the third deadline is different from the first deadline and second deadline, and wherein the second deadline specifies a time which occurs before the time of the third deadline; and
   transmitting, by the computer, the first isochronous request and the first deadline and the second isochronous request and the second deadline and the third isochronous request and the third deadline to a data storage device, wherein the transmitting the second and third isochronous requests enable the data storage device to determine amounts of time associated with completing execution of each of the second and third isochronous requests, and wherein the transmitting the second and third deadlines enable the data storage device to reduce total latency of processing the second and third requests by completing the third isochronous request after completion of the first isochronous request but before completing the second isochronous request.

2. The method of claim 1, further comprising: monitoring a process of a system of the data storage device to identify the second and third isochronous requests.

3. The method of claim 1, further comprising: sorting the isochronous requests in a queue to improve throughput of processing commands by the data storage device.

4. The method of claim 1, wherein the transmitting the second isochronous request and the second deadline and the third isochronous request and the third deadline to the data storage device comprises communicating the second isochronous request and the second deadline and the third isochronous request and the third deadline to a controller of the data storage device.

5. The method of claim 1, wherein the transmitting the first and second and third isochronous requests comprises transmitting at least one asynchronous request to the data storage device.

6. The method of claim 1, further comprising: transferring the second and third isochronous requests and the second and third deadlines to a device driver of the data storage device.

7. The method of claim 1, further comprising: processing, by the data storage device, the third isochronous request if the value of the third deadline is less than a threshold value equal to a sum of a seek time, a rotational delay time, a first transmission time, and a product of a transmission time and a number of outstanding requests.

8. The method of claim 1, wherein the second and third deadlines comprise completion deadlines, wherein further a completion deadline of the completion deadlines for a read request specifies a time that the data storage device finishes reading data of the read request from a storage medium and finishes transferring the data of the read request to the computer.

9. The method of claim 1, wherein the determination of the amount of time associated with completing execution of the second isochronous request comprises analyzing a location of a head of the data storage device relative to a logical block address (LBA) of the second isochronous request.

10. The method 9, further comprising: completing, by the data storage device, the first isochronous request before completing the second isochronous request, wherein the first deadline specifies a completion time which occurs earlier than the completion time of the second deadline.

11. The method of claim 1, wherein the transmitting the second and third deadlines to the data storage device comprises transmitting units of time for the second and third deadlines.

12. An apparatus of a computer to improve performance of a data storage device, the apparatus comprising:
    a request identifier configured to identify isochronous requests from a plurality of requests to be issued to the data storage device;
    a logic module configured to assign individual completion deadlines to each of the isochronous requests; and
    a communication module configured to communicate the isochronous requests and the individual completion deadlines to the data storage device to enable the data storage device to prioritize the isochronous requests based upon an analysis which involves at least one of the individual completion deadlines, wherein the communication of the isochronous requests enable the data storage device to determine amounts of time associated with completing execution of each of the isochronous requests, and wherein the communication of the individual completion deadlines enable the data storage device to reduce total latency of processing the isochronous requests by completing a first isochronous request with a first completion deadline before completing a second isochronous request with a second completion deadline, and wherein the second completion deadline specifies a time which occurs before the time of the first completion deadline.

13. The apparatus of claim 12, wherein the data storage device comprises logic configured to compare the isochronous requests with pending requests in at least one drive queue and sort the isochronous requests and the pending requests based on at least one of geometry of the data storage device, the individual completion deadlines, and priority information for asynchronous requests.

14. The apparatus of claim 12, wherein the data storage device comprises logic configured to determine the amount of time associated with completing execution of the first isochronous request, wherein further the data storage device comprises logic configured to process the first isochronous request before processing a second isochronous request based on the determination of the amount of time.

15. The apparatus of claim 12, wherein the plurality of requests comprises both asynchronous requests and isochronous requests, wherein further the communication module is configured to communicate the individual completion deadlines to the data storage device via insertion of data for the individual completion deadlines in fields of Native Command Queuing (NCQ) commands.

16. A data storage device, comprising:
    random access memory (RAM);
    a logic module configured to place isochronous requests in at least one queue of the RAM, wherein each one of the isochronous requests comprises a deadline of completion, and wherein each deadline of completion is specified in units of time, and wherein the logic module prioritizes the isochronous requests in the at least one queue based on analyzing the deadlines of completions, and wherein the logic module determines amounts of time associated with completing execution of each of the isochronous requests, and wherein the logic module reduces total latency of processing the isochronous requests by completing a first isochronous request with a first deadline of completion before completing a second isochronous request with a second deadline of completion, and wherein the second deadline of completion specifies a time which occurs before the time of the first deadline of completion; and
    a controller to receive a plurality of requests from a communication module of a computer, wherein the plurality of requests comprises asynchronous requests and the isochronous requests, and wherein the controller is configured to complete the execution of each of the isochronous requests by the time specified by each of the associated deadlines of completion.

17. The data storage device of claim 16, wherein the data storage device comprises one of a serial hard disk drive, a parallel hard disk drive, an optical storage drive, a digital versatile disc drive, and a flash memory drive.

18. The data storage device of claim 17, wherein the data storage device comprises a serial advanced technology attachment (SATA) hard disk drive, wherein further the controller is configured to receive the deadlines of completions via data inserted into fields of Native Command Queuing (NCQ) commands.

19. The data storage device of claim 18, wherein the controller and the logic module are configured to complete the first isochronous request before completing second isochronous request in response to a determination by the logic module that the data storage device is able to complete both the first and second isochronous requests before the first deadline of completion, wherein the deadline of completion of the first isochronous request specifies a time which occurs subsequent to the time specified by the deadline of completion of the second isochronous request.

* * * * *